United States Patent [19]

Newton

[11] Patent Number: 4,672,303

[45] Date of Patent: Jun. 9, 1987

[54] INDUCTOR CURRENT CONTROL CIRCUIT

[75] Inventor: Stephen F. Newton, Winchester, Ky.

[73] Assignee: International Business Machines Corporation, Armonk, N.Y.

[21] Appl. No.: 901,347

[22] Filed: Aug. 28, 1986

[51] Int. Cl.[4] ............................................. G05F 1/575
[52] U.S. Cl. ................................... 323/285; 323/222; 323/224; 323/288
[58] Field of Search .................... 320/1; 323/282, 283, 323/285, 288, 222, 224; 307/351

[56] References Cited

U.S. PATENT DOCUMENTS

| 4,392,103 | 7/1983 | O'Sullivan et al. | 323/285 |
| 4,459,539 | 7/1984 | Cordy | 323/288 |
| 4,553,082 | 11/1985 | Nesler | 323/288 |
| 4,555,655 | 11/1985 | Tanaka | 320/1 |

FOREIGN PATENT DOCUMENTS

| 3420583 | 12/1985 | Fed. Rep. of Germany | 323/285 |
| 72446 | 6/1979 | Japan | 323/288 |
| 5620 | 1/1985 | Japan | 323/222 |
| 760053 | 9/1980 | U.S.S.R. | 323/285 |

Primary Examiner—William H. Beha, Jr.
Attorney, Agent, or Firm—John J. McArdle, Jr.

[57] ABSTRACT

A DC to DC power converter having reduced switching loss for operation at high frequencies. As disclosed, a buck, or forward, converter includes a first FET as the switching device in series with an inductor and a second FET as the flywheel device. At the common node to which the two FET's and the inductor are connected, there is sufficient capacitance that the FET's may be turned off without appreciable voltage change across the FET's. The value of the inductor is chosen, with respect to the input and output voltages and frequencies of operation involved, to insure that the inductor current polarity reverses each cycle, raising the node voltage to the level of the input voltage, substantially eliminating turn-on losses of the first FET. Control circuitry is provided for regulation of the power converter to control the peak-to-peak current in the inductor and to insure that at least a selected minimum value of the inductor current is present for each cycle of operation of the converter. An over-voltage protection circuit for the output of the converter is also provided.

7 Claims, 23 Drawing Figures

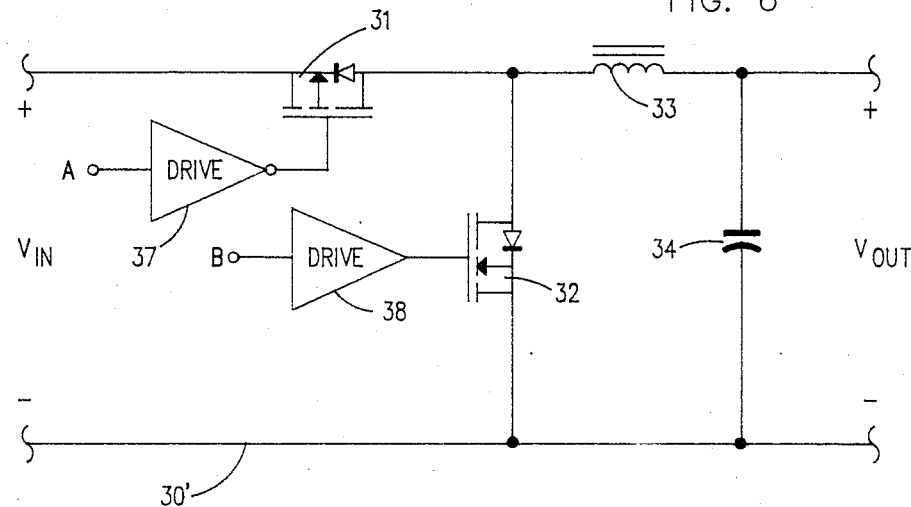
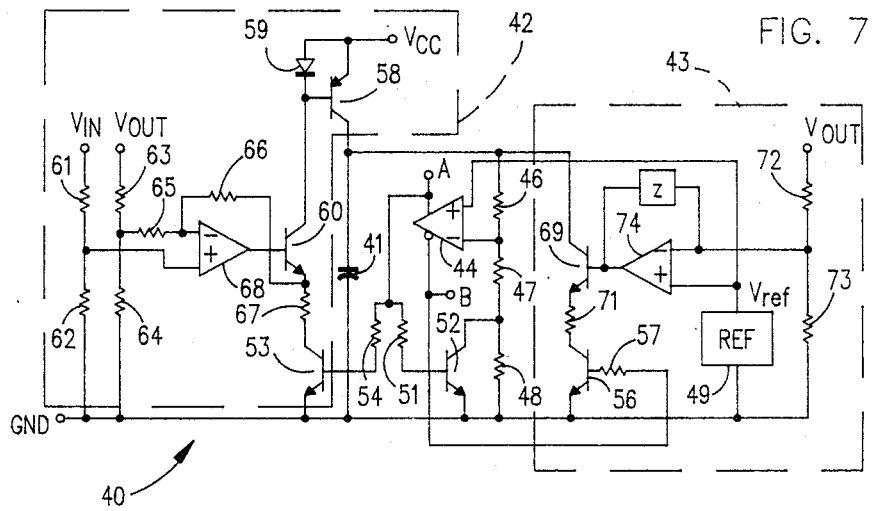

INDUCTOR CURRENT CONTROL CIRCUIT

BACKGROUND OF THE INVENTION

1. Field of the Invention

This invention relates generally to current control circuits, and more particularly concerns a control circuit for controlling the switching of voltages applied to an inductor to establish a desired current flow through the inductor.

2. Background Art

In various types of electronic circuits, voltages are applied to an inductor in order to produce desired forms of current flow through the inductor. For example, sawtooth scan currents are produced in yoke inductors in television circuits. As another example, inductor currents are varied for transferring energy from the input to the output of off-line switching power converters.

As a more specific example, in a particular type of DC-to-DC buck converter, to be described in more detail hereinafter, the peak-to-peak current through an inductor in the buck converter is controlled to be maintained at a constant value by a control circuit. In this exemplary buck converter, the converter serves as a regulator and must be controlled to provide a regulated output voltage. The control circuit turns both the series and the flywheel FET's in this particular buck regulator on and off in a manner to maintain the peak-to-peak inductor current constant for variations in input voltage and load, with the average DC value of this constant peak-to-peak inductor current being varied by the control circuit to provide output voltage regulation.

SUMMARY OF THE INVENTION

It is the general aim of the present invention to provide a control circuit for controlling current flow through an inductor in systems such as the foregoing buck regulator system.

This objective has been accomplished in accordance with certain principles of the invention by providing a control circuit which includes a capacitor operable to be charged over a range of voltages which is analogous to the range of values of current flow in the inductor through which the flow of current is to be controlled.

In one form of this control circuit, the capacitor in the control circuit is charged while current through the inductor rises (due to a first applied voltage) until the voltage on the capacitor has risen to a level indicative of a desired change in the current through the inductor. A first control signal is then produced by the control circuit to both (a) reverse the polarity of the voltage across the inductor through the application of a second voltage thereto and (b) begin discharging the capacitor in the control circuit. The capacitor is then permitted to discharge to a particular voltage level, at which time a second control signal is produced to again change the polarity of voltage across the inductor and to once again begin charging the capacitor in the control circuit.

Advantageously, in this particular form of control circuit, the discharge of the capacitor can be varied in dependence upon the value of the second voltage applied to the inductor.

In the foregoing buck regulator circuit, the first voltage applied to the inductor is the difference between an input voltage and an output voltage, and the second voltage applied to the inductor is the output voltage. In this case the control arrangement provides regulation of the output voltage of the buck converter circuit. Therefore, the control circuit provides not only peak-to-peak forward current control for the current through the inductor, but also regulation of the output voltage, both without requiring a constraint upon the timing of the forward or reverse current or the frequency of operation of the buck converter circuit.

Other objects and advantages of the invention, and the manner of this implementation, will become apparent upon reading the following detailed description and upon reference to the drawings, in which:

BRIEF DESCRIPTION OF THE DRAWING

FIG. 6 is a diagrammatic illustration of the converter of FIG. 3 showing additional elements of peak-to-peak current control circuitry;

FIG. 7 is a circuit diagram of a peak-to-peak current control circuit for the buck converter of FIG. 3;

DETAILED DESCRIPTION

Figure 1:
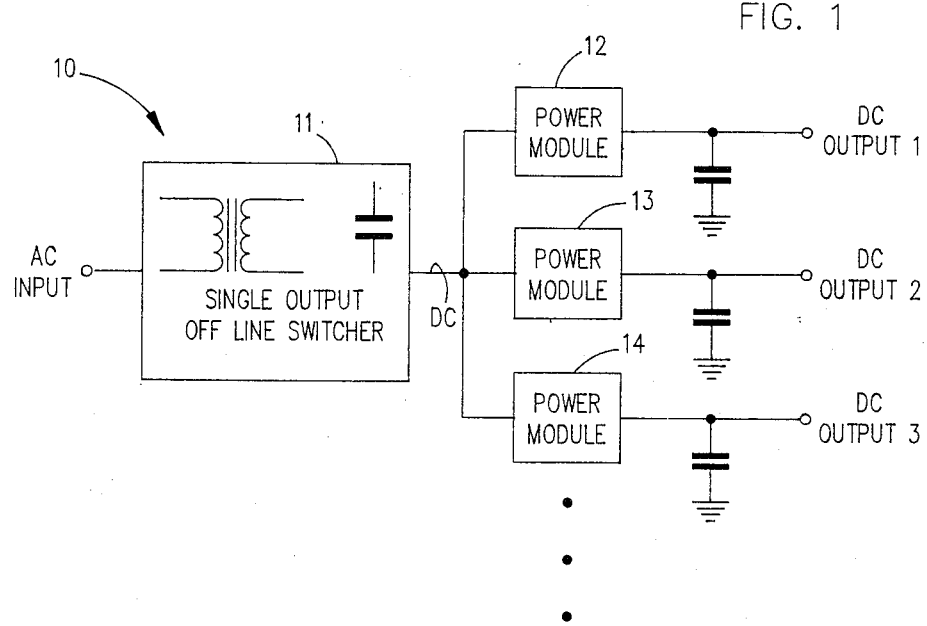
FIG. 1 is a schematic illustration of a power supply arrangement utilizing DC to DC converters in accordance with the present invention.

While the invention is susceptible to various modifications and alternative forms, certain illustrative embodiments thereof have been shown by way of example in the drawings and will herein be described in detail. It should be understood that it is not intended to limit the invention to the particular forms disclosed, but the intention is to cover all modifications, equivalents, and alternatives falling within the spirit and scope of the invention, as defined by the appended claims.

With initial reference to FIG. 1, a power supply arrangement 10 includes a single output off-line switcher 11 which converts an AC input to a single level DC output. The output of the off-line switcher 11 is then coupled to a number of power modules 12, 13, 14, etc., which are DC-to-DC converters for producing different DC output voltages. As many converters 12–14 are employed as are necessary to produce the required different DC outputs such as outputs 1, 2 and 3.

Figure 2A:
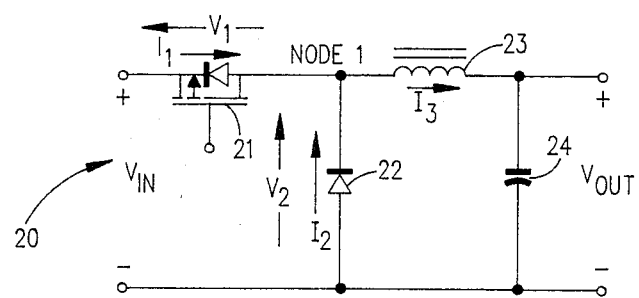
FIG. 2a is a circuit diagram and FIGS. 2b–2d are illustrative waveforms for a prior art DC to DC buck converter.
Figure 2B:
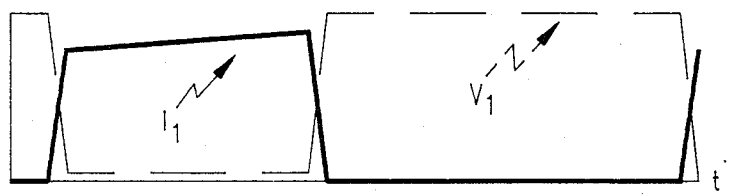
Figure 2C:
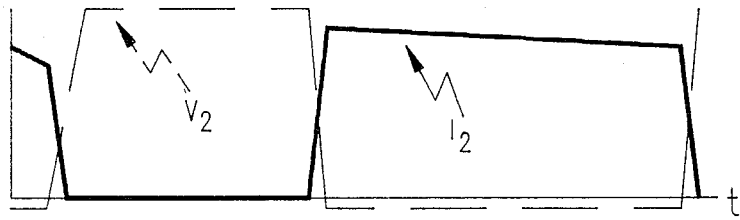
Figure 2D:
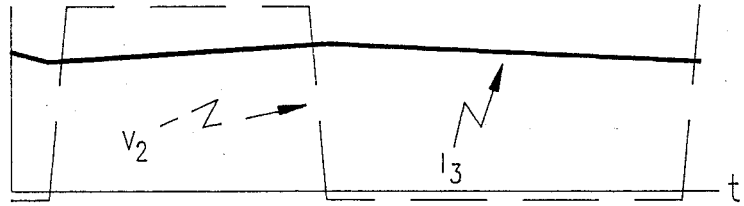

With additional reference to FIG. 2, prior power modules, or DC-to-DC converters, have taken a number of forms, including that of the buck converter 20 of FIG. 2a. In FIG. 2a, a conventional buck converter, or current step-up power converter, 20 utilizes an FET 21 for the series switch and a diode 22 for the flywheel rectifier. During normal operation of this standard converter, the FET 21 is turned on, impressing the input voltage, less the output voltage, across an inductor 23. Placing this voltage across the inductor causes the current in the inductor to increase, charging an output capacitor 24 while also delivering current to any load connected in parallel with the capacitor.

When the FET 21 is turned off, the voltage at node 1 (the connection point for the FET 21, the diode 22 and the inductor 23) falls until the diode 22 becomes forward biased. Current then flows through the diode 22 and the inductor 23 with decreasing amplitude until the FET 21 is again turned on and the cycle repeated.

Figure 3A:
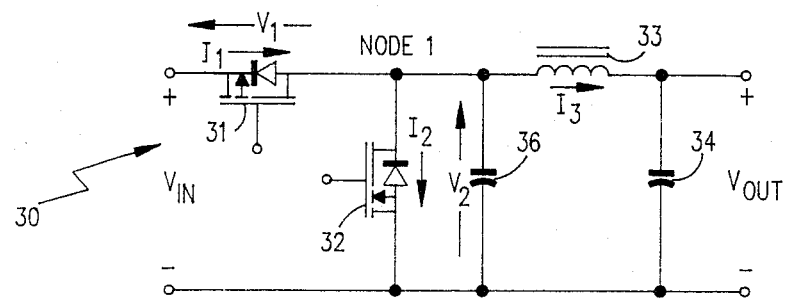
FIG. 3a is a circuit diagram and FIGS. 3b–3d are illustrative waveforms for a DC-to-DC buck converter in accordance with an aspect of the present invention.
Figure 3B:
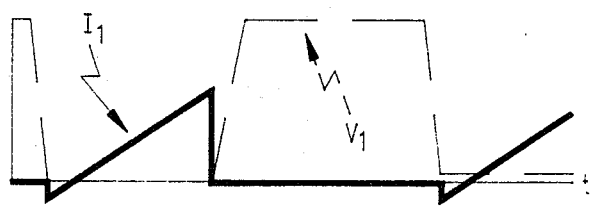
Figure 3C:
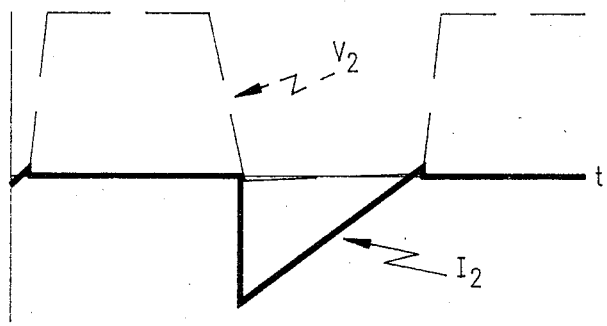
Figure 3D:
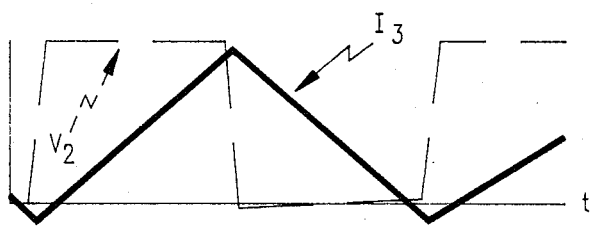
Figure 4A:
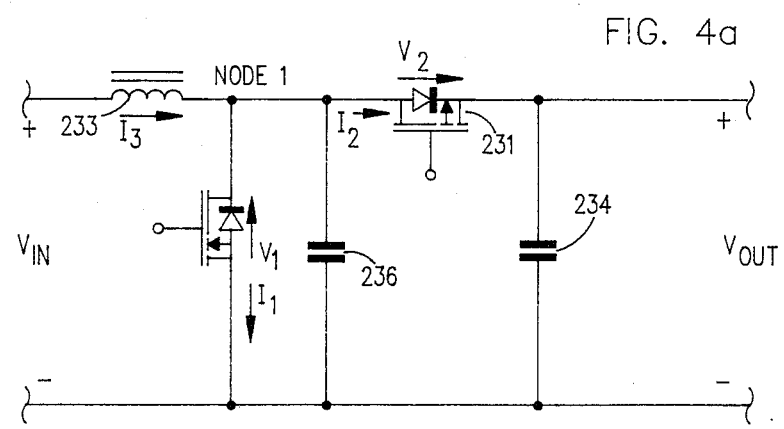
FIG. 4a is a circuit diagram and FIGS. 4b–4d are illustrative waveforms for a DC-to-DC boost converter in accordance with an aspect of the present invention.
Figure 4B:
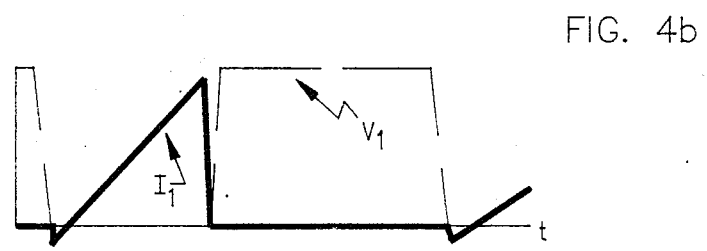
Figure 4C:
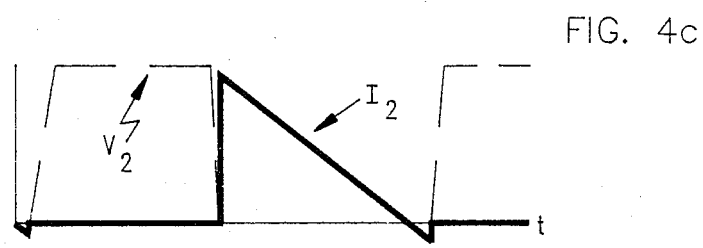
Figure 4D:
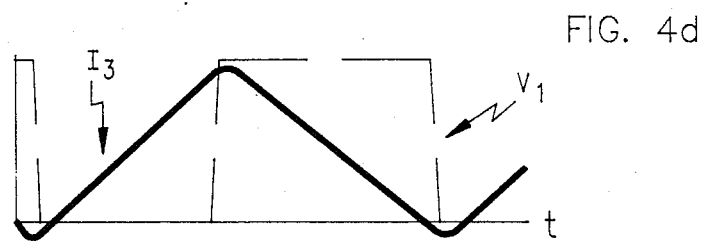
Figure 5A:
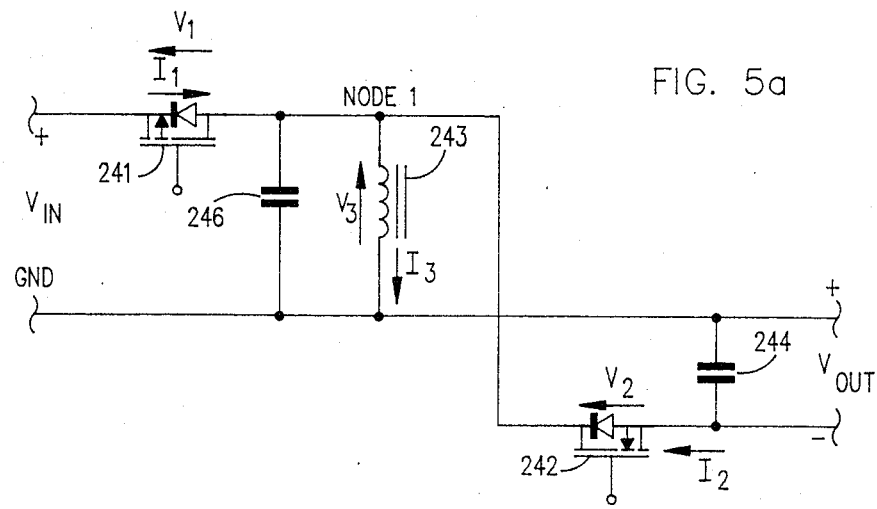
FIG. 5a is a circuit diagram and FIGS. 5b–5d are illustrative waveforms for a DC-to-DC buck-boost converter in accordance with an aspect of the present invention.
Figure 5B:
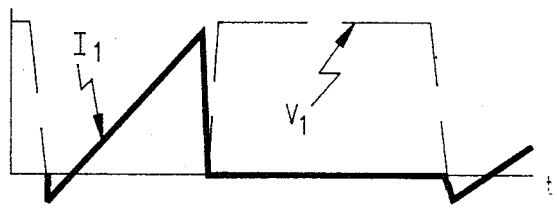
Figure 5C:
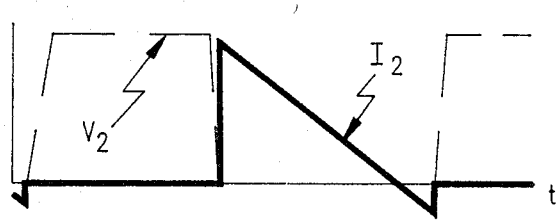
Figure 5D:
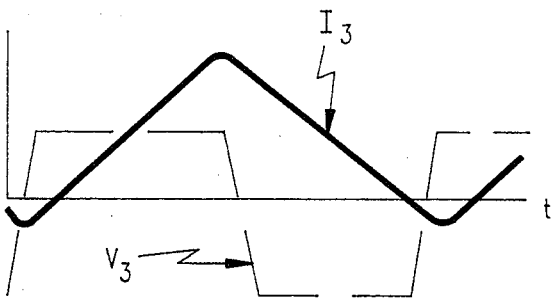

Switching loss occurs when the FET 21 is turned on and off because of the finite time required for the current to start and stop flowing. As the FET is turned on, current flowing through the device causes the voltage on node 1 to rise, producing dissipation equal to the instantaneous product of current and voltage at the FET over the time interval required for turn on. Similarly, when the FET 21 is turned off, the simultaneous presence of voltage and current produces substantial dissipation. In the past, the diode 22 has been replaced with an additional FET (having an orientation as shown for the FET 32 in FIG. 3a). This improves efficiency in the converter.

As earlier discussed, timing of FET turn on and turn off becomes critical in a two FET configuration. As also earlier discussed, it would be desirable to increase the frequency of operation of a standard converter such as the converter 20 in order to reduce the size of the reactive components in the converter. However, in increasing frequency, both switching loss and critical timing requirements become more difficult to deal with.

Turning now to FIG. 3, a buck converter 30 configured in accordance with certain aspects of the invention includes a series switch FET 31 and a flywheel FET 32 connected at a node, designated node 1, with one terminal of an inductor 33. An output capacitor 34 is provided at the output of the converter 30, and a capacitor 36 is also provided in parallel with the flywheel FET 32. The FET's 31 and 32 are power MOSFET's including internal diodes. The FET 31 is a p-channel MOSFET and the FET 32 is an n-channel MOSFET. The source of the FET 31 is at the converter input and the drain of the FET 31 is connected to node 1, which is connected to the drain of the FET 32 and one terminal of the inductor 33. The source of the FET 32 is connected to circuit common, or ground. The gates of the FET's are coupled to a suitable control circuit as shall be described in more detail hereinafter.

Each FET 31, 32 includes an internal diode, with the internal diode of the FET 31 poled to conduct current from node 1 toward the input, and the internal diode of the FET 32 poled to conduct current from circuit common to node 1. Each FET includes a parasitic capacitance, and due to the low impedance of the voltage source input, the capacitances of the FET's 31 and 32 are effectively connected in parallel between node 1 and circuit common. In many cases, a physical capacitor 36 is not required, as the FET parasitic capacitances are of sufficient size to support the voltage at node 1 during turn-off of each of the FET's. In subsequent illustrations of the converter of FIG. 3, the discrete capacitor 36 is omitted.

In the converter 30, the inductor 33 is selected to be of a value to insure that the inductor current polarity reverses during each normal cycle of operation (each cycle of turn-on and turn-off of the series FET 31). Insuring reversal of the inductor current requires not only the selection of the inductance value, but also (a) the operation of the converter with a peak forward inductor current that is not too large relative to the size of the output voltage and (b) the provision of a suitably long off-time for the series FET. To insure current reversal, the output voltage must be greater than or equal to the product of (a) the inductance of the inductor 33 and (b) the value of the peak inductor current (the inductor current when the series FET is turned off), divided by the length of the off-time of the series FET 31.

A typical operation cycle for the converter 30 begins with the turn-off of the FET 31, after which the node 1 voltage falls until it reaches zero, as the inductor 33 draws current first from the capacitor 36 and then through the internal diode of the FET 32. The flywheel FET 32 is then turned on with zero switching loss since the voltage across it is zero at the time of turn-on. The flywheel FET 32 is not turned off until the direction of current flow in the inductor 33 has reversed, with current flow through the flywheel FET. When the fly wheel FET is turned off, the capacitor 36 holds the voltage at node 1 near zero during the turn off interval, after which the (now-reversed) current through the inductor 33 drives the node 1 voltage up to the level of the input voltage. Note that at this time the flywheel FET is turned off and its internal diode is non-conductive since it is reverse biased. The series FET 31 is then turned on with substantially no voltage across the FET , so that there are substantially no turn-on losses. The cycle then repeats.

It should be noted that the turn-on and turn-off of both the series FET 31 and the flywheel FET 32 occur with nearly zero volts across the FET's. Also, there is an inherent, desirable dead time between the turn-off of one FET and the turn-on of the other. The turn-on of the FET 31 occurs after the inductor current has reversed and taken node 1 to the level of $V_{IN}$, and the turn-on of FET 32 occurs when the inductor current has taken node 1 low after the series FET 31 has been turned off.

The turn-on timing of the FET's is less critical (allowing dead time) because stored charge in the FET internal diodes has the FET on-time to recombine if turn-on is late. That is, when each FET is turned on, the internal diode of the other FET is reverse biased and non-conductive so that energy is not expended in neutralizing the stored charge associated with the device forward voltage drop. Switch through (simultaneous FET conduction) will not result unless turn-on occurs prior to the normal transition dead time. Overall conversion efficiency and ease of control for the converter is therefore improved, and operation at high frequencies is permitted.

While the presently preferred form of converter is a buck converter, the principles of the invention are applicable to other converter topologies such as the boost converter and buck-boost converter topologies. With reference, for example, to FIG. 4, a boost converter configured in accordance with the invention includes FET's 231 and 232 interconnected at node 1 and an inductor 233 connected between the input voltage $V_{IN}$ and node 1. A capacitor 234 is connected across the output $V_{OUT}$, and a capacitor 236 is connected in parallel with the FET 232.

A typical operation cycle begins with the turn-off of the FET 232, after which the voltage at node 1 rises to the level of $V_{OUT}$ as current in the inductor 233 charges the capacitor 236. The FET 231 is then turned on with zero switching loss, since the voltage across it is zero. The turn-off of the FET 231 does not occur until the direction of current flow in inductor 233 has reversed. After the turn-off of the FET 231, the current in the inductor 233 draws charge from the capacitor 236 until the voltage on node 1 is zero, after which the cycle repeats. It should be noted that the turn-on and turn-off of the FET's 231 and 232 occur at zero voltage since the capacitor 236 holds the node 1 voltage almost constant while switching occurs. Operation and advantages are similar to those previously described for the buck converter of FIG. 3.

With reference now to FIG. 5, the invention is embodied in a buck-boost converter which includes FET's 241 and 242, interconnected at node 1, to which is also connected an inductor 243. A capacitor 244 is coupled across the output $V_{OUT}$, and a capacitor 246 is coupled across the inductor 243. A typical operating cycle of the converter begins with the turn-off of the FET 241. After the turn-off of the FET 241, the voltage between node 1 and ground falls to the level of $V_{OUT}$ as current in the inductor 243 discharges the capacitor 246. The FET 242 is then turned on with zero switching loss, since the voltage across it is zero. Turn-off of the FET 242 does not occur until the direction of current flow in the inductor 243 has reversed. After the turn-off the FET 242, the current in the inductor 243 charges the capacitor 246 until the voltage at node 1 is equal to $V_{IN}$, after which the cycle repeats. Again, it should be noted that turn-on and turn-off of the FET's 241 and 242 occur at zero voltage since the capacitor 246 holds the node 1 voltage almost constant while switching occurs. The operation and advantages of the buck-boost converter are similar to those previously described for the other converter topologies.

Returning to consideration of the buck converter of FIG. 3, in order to regulate the output of the buck converter 30, a control circuit is provided for controlling the on- and off-times of the two FET's 31 and 32.

Conventional control circuits of DC-to-DC converters usually provide output voltage regulation in one of three ways. In constant frequency pulse width modulation, the operating frequency is held constant while on-time of the series switch is varied to compensate for variations in input voltage and load. In constant frequency peak current control, the operating frequency is held constant while the maximum amplitude of the current in the series switch is varied to compensate for variations in load. Compensation for input voltage variations is inherent in the peak current control. In constant on-time variable frequency control, the series switch on-time is held constant and off-time is varied to compensate for variations in load and input voltage.

In the converter circuit 30, it is advantageous to provide a control circuit which is independent of time constraints such as constant frequency or constant on-time. It has been found that the use of a control circuit which maintains a constant peak-to-peak current through the inductor 33 provides the requisite regulation and is particularly suited to the converter 30, which has a requirement that the inductor current reverse on each cycle of operation.

To produce output voltage regulation and constant peak-to-peak current, a control circuit must implement two timing equations. The on-time of the series switch, in this case the series FET 31, is given by:

$$T_{ON1} = (L)(I_{P-P})/(V_{IN} - V_{OUT}) \quad (1)$$

In this expression L is the inductance value of the inductor 33, and $I_{P-P}$ is the peak to peak value of the inductor current. $V_{IN}$ is the input voltage, and $V_{OUT}$ is the output voltage. The on-time of the flywheel device, in this instance the flywheel FET 32, is given by:

$$T_{ON2} = (L)(I_{P-P})/(V_{OUT}) \quad (2)$$

In FIG. 6 a DC to DC converter 30' (which is the same as the converter 30 of FIG. 3 with the addition of drive circuitry for the FET's) includes a drive circuit 37 for the FET 31 and a drive circuit 38 for the FET 32. These drive circuits, exemplary forms of which shall be described in more detail hereinafter, receive control signals from the control circuit illustrated in FIG. 7 in order to control the conduction times of the FET's 31, 32. The connections of the control signals to the drive circuits are shown by the letter designations A and B in the schematic of FIG. 7 and the corresponding designations in FIG. 6.

As shown in FIG. 7, a control circuit 40 for the converter 30' of FIG. 6 includes a capacitor 41 which is charged and discharged to simulate the peak-to-peak current flow through the inductor 33 in the converter. Just as the change in current per unit time through the inductor is proportional to the voltage across the inductor, the change in voltage on the capacitor is proportional to the current into the capacitor.

In the control circuit of FIG. 7, a charging circuit 42 charges the capacitor 41 with a current during substantially the same time interval that the series FET 31 is turned on in the converter circuit 30'. In the converter circuit, during this time, the voltage across the inductor 33 is equal to the difference between the input voltage and the output voltage of the converter. In the control circuit 40, the charging circuit 42 provides a charging current to the capacitor 41 which is proportional to the difference between the input and output voltages on the converter. Therefore, since the time intervals are substantially the same and the charging current for the capacitor 41 is proportional to the voltage applied to the inductor 33, the voltage change on the capacitor 41 in the control circuit is substantially proportional to the current change in the inductor 33 in the inverter.

During the time interval that the series FET 31 is non-conductive and the flywheel FET 32 is conductive, the current in the inductor 33 decreases. During this interval, the voltage across the inductor is substantially equal to $V_{OUT}$ (applied in a reverse direction). A discharge circuit 43 in the control circuit 40 provides a discharge current (to discharge the capacitor 41) which in steady state is proportional to the converter output voltage during this interval. As in the case of the charging circuit 42, since the discharge circuit 43 discharges the capacitor 41 over substantially the same time interval as that during which the inductor 33 is connected across the output voltage, and since the discharge current is proportional to the converter output voltage, the reduction in voltage on the capacitor 41 is proportional to the reduction in current through the inductor 33 in the converter.

In the control circuit 40, the voltage excursions of the capacitor 41 are compared to a reference by a comparator 44, the inverted and non-inverted outputs of which are coupled to the drive circuits 38, 37, respectively, in the converter 30'.

When the voltage on the capacitor 41 reaches its upper limit, the non-inverted output (A) of the comparator 44 goes low and the output of the drive circuit 37 provides a positive signal to the gate of the FET 31, turning off the series switch, ending the current rise in the inductor 33 for that cycle. At the same time, the inverted output (B) of the comparator 44 goes high, and the drive circuit 38 provides a positive signal to the flywheel FET 32, turning on the FET. In practice, the drive circuit 38 provides a delay prior to turning on the FET 32, as shall be described in more detail hereinafter.

In like fashion, when the voltage excursion of the voltage on the capacitor 41 reaches a low limit, the comparator 44 changes state, with the drive circuit 38 turning off the flywheel FET 32 and the drive circuit 37 turning on the FET 31, after a suitable delay.

In the control circuit 40, a resistance divider made up of resistors 46, 47 and 48 is connected across the capacitor 41. The inverting input of the comparator 44 is connected to the junction between the resistors 46 and 47, and the non-inverting input of the comparator 44 is connected to a positive voltage reference produced by a voltage reference circuit 49. When the capacitor 41 is being charged by the charging circuit 42, the voltage at the inverting input of the comparator 44 is lower than the reference voltage, and the non-inverted output of the comparator is at a logic high. This logic high is coupled through a resistor 51 to the base of a transistor 52, saturating the transistor and shorting out the resistor 48 in the resistance string. Therefore, the voltage at the junction between the resistor 46 and the resistor 47 is lower than the reference voltage and increasing as the capacitor 41 charges.

The charging circuit 42 is turned on and off by saturating and turning off a transistor 53 in the charging circuit. During the charging interval, the non-inverted output of the comparator 44 (at a logic high) is coupled through a resistor 54 to the base of the transistor 53, saturating the transistor and activating the charging circuit. During the charging interval, a transistor 56 in the discharge circuit 43 is turned off, so that the discharge circuit does not discharge the capacitor 41. The inverted output of the comparator 44 is coupled through a resistor 57 to the base of the transistor 56, which (during the charging interval) is turned off by the logic low on the inverted output of the comparator.

The charging circuit 42 produces a current (to charge the capacitor 41) which is proportional to the difference between the input and output voltages of the inverter circuit 30'. This current flows through a transistor 58 from a voltage supply $V_{CC}$. The transistor 58 is connected at the base and emitter to a diode 50 (which is preferably the base emitter junction of an identical transistor). The transistor 58 and the diode 59 are interconnected in the form of a "current mirror", and the current through the transistor 58 is identical to that flowing through the diode 59. The current through the diode 59 is established by the current through a transistor 60 and a resistor 67 connected in series with the diode 59 and the transistor 53. This current level is in turn established by an operational amplifier 68 in cooperation with resistors 61–66 to be proportional to the difference between the input and output voltages of the converter 30'.

The resistors 61–66 are chosen to yield a voltage at the emitter of the transistor 60 that is proportional to the difference between the converter input and output voltages. When the transistors 53 is turned on by the comparator 44, the resistor 67 converts the voltage at the emitter of the transistor 60 into a current that is, as described earlier, mirrored into the collector of the transistor 58 to charge the capacitor 41.

In one form of charging circuit 42, the resistor 61 is 93 K ohms, the resistor 62 is 5 K ohms, the resistor 63 is 8.57 K ohms, the resistor 64 is 1 K ohms, the resistor 65 is 20 K ohms, the resistor 66 is 20 K ohms, and the resistor 67 is 1.11 K ohms. The voltage produced at the emitter of the transistor 60 in this configuration is about 0.1 times the difference between the input and output voltages of the converter 30'.

The charging current supplied to the capacitor 41 through the transistor 58 causes the voltage across the capacitor to rise until the voltage at the inverting input of the comparator 44 exceeds the reference voltage $V_{REF}$. The comparator 44 then changes state, and the transistors 52 and 53 are turned off. The charging current ceases, and the voltage at the junction between the resistors 46 and 47 rises, since the resistor 48 is now effectively in series with the resistors 46 and 47, raising the threshold voltage for the comparator.

At the same time, the transistor 56 in the discharge circuit 43 is turned on since the inverted output of the comparator 44 is now high, while the non-inverted output of the comparator is low. Discharge current is now permitted to flow through a transistor 69 and a resistor 71 connected in series with the transistor 56. When the voltage at the inverting input of the comparator 44 falls below the reference voltage $V_{REF}$, the comparator 44 outputs again change state, turning off the transistor 56 and turning on the transistors 52 and 53 to repeat the cycle.

While the capacitor 41 is being discharged by the discharge circuit 43, the level of the discharge current in the transistor 69 is set by the resistor 71 and an error voltage applied to the base of the transistor 69. This error voltage is proportional to the difference between the reference voltage $V_{REF}$ and a portion of the output voltage (of the inverter 30') determined by resistors 72 and 73 connected in the form of a resistance divider between $V_{OUT}$ and circuit common, or ground. The divided down $V_{OUT}$ is coupled to the inverting input of an operational amplifier 74, whose non-inverting input is connected to the voltage reference $V_{REF}$. A feedback network containing an impedance Z is provided for stability. The operation of the control circuit 40 to establish the proper conduction intervals for the FET 31 and the FET 32 shall now be described.

The signal A from the non-inverted output of the comparator 44 is used to determine the on time of the series pass device (series FET 31) in the converter circuit 30'. Since the signal A is high while the capacitor 41 is being charged to a set voltage by a current proportional to $V_{IN}-V_{OUT}$, the FET 31 will have an on time proportional to $V_{IN}-V_{OUT}$ as is required.

The signal B from the inverted output of the comparator 44 is used to determine the on time of the flywheel FET 32. This signal is high, turning on the FET 32, during the time that the capacitor 41 is being discharged by the transistor 69 in the discharge circuit 43. The operational amplifier 74 and surrounding circuitry adjust the current in the transistor 69 (over a number of cycles of operation) so that the non-inverting and inverting inputs of the operational amplifier 74 are at almost the same potential, in order to insure producing the desired output voltage level at $V_{OUT}$ of the converter 30'.

For example, if $V_{OUT}$ rises, the voltage at the inverting input to the operational amplifier 74 increases and thus the output of the amplifier goes down. This reduces the current through the transistor 69 and the resistor 71 so that the capacitor 41 discharges more slowly. This decreases the duty cycle of the inverter 30' (by increasing the off time of th series FET 31). This will in turn bring down the converter output voltage to its proper level, perhaps after a few cycles of operation.

Figure 8:
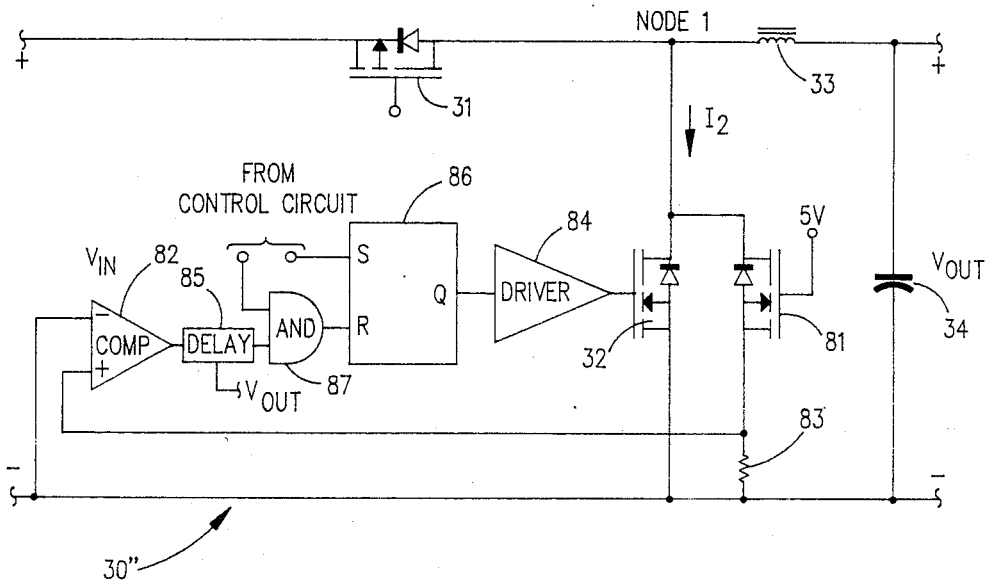
FIG. 8 is a diagrammatic illustration of the buck converter of FIG. 3 together with current limit circuitry.

Turning now to FIG. 8, a buck converter 30" substantially the same as that shown in FIG. 3, includes additional circuitry to provide current limiting. When the converter is controlled by a control circuit to provide constant peak-to-peak current through the inductor 33, the inductor current is substantially a triangular waveform as shown in Fig. 3d. With changes in the load on the output of the converter, the current waveform in effect shifts upward and downward to transfer more or less average current from the input to the output, as required. The effective output current of the converter is one-half the sum of the maximum and minimum inductor currents.

The minimum inductor current occurs when the flywheel FET 32 turns off, and the maximum current occurs when the series FET 31 turns off. Since peak-to-peak inductor current is maintained constant, the effective output current may be held below a given value by holding either the minimum or maximum current below a defined level. The minimum current may be held below a given level by sensing current in the flywheel FET 32 and not permitting the FET 32 to turn off until the current has fallen to the selected minimum value. If the minimum current is selected to be zero, it is sufficient to simply sense the voltage across the flywheel FET 32, keeping this device on until the polarity of the voltage across it reverses. The current limit set point will be independent of the on-state resistance of the FET 32 since only the polarity of the signal is sensed.

FIG. 8 illustrates how such a current limit concept can be implemented. During normal operation of the converter 30", toward the end of the conduction interval for the flywheel FET 32, current reverses in the inductor 33 and flows in the direction of the current arrow I₂ through the FET 32. Normally, the duration of this reverse current is established by the converter control circuit in order to establish the appropriate net forward current flow through the inductor 33 to provide the desired and regulation of the output voltage $V_{OUT}$.

This control of the flywheel FET 32 is represented in FIG. 8 by the coupling of a signal from the control circuit to the rest input of a flip-flop 86 to effect the removal of the gate drive from the flywheel 32. When the flip-flop 86 is reset, its Q output goes low, and this low is coupled to a driver 84, whose output (the gate drive for the flywheel 32) goes low, turning off the FET 32.

The current limit circuitry of FIG. 8 functions to insure that the current in the flywheel FET 32 (and in the inductor 33) has reversed before the control circuit is permitted to remove the gate drive from the FET 32. The current limit circuitry includes an FET 81 connected in parallel with the flywheel FET 32 and a resistor 83 in series with the FET 81. When the flywheel FET 32 is conductive, the FET 81 is saturated, providing a low impedance path for the voltage across the FET 32 to the inverting input of a comparator 82. This permits accurate sensing of the voltage across the flywheel FET 32. The resistor 83 is in series with the FET 81 has a relatively high resistance, and substantially the entire voltage across the FET 32 is coupled to the comparator 82 when the FET 81 is saturated. When the flywheel FET 32 is non-conductive, the FET 81 operates in the cut-off region, protecting the comparator input from damage due to excessive voltage, while allowing only a small current flow through the sensing circuit.

Before the reversal of current in the FET 32, the non-inverting input to the comparator 82 is at a lower voltage than the inverting input, and the output of the comparator 82 is low. This low, coupled through a delay circuit 85 and the AND gate 87 to the reset input of the flip-flop 86, prevents the flip-flop from being reset and thus maintains the drive to the gate of the flywheel FET 32.

After the current in the flywheel FET 32 has reversed, so that it is flowing in the direction of the current arrow I₂, the voltage across the flywheel FET 32 changes polarity, and the output of the comparator 82 goes high. This high output from the comparator 82 is coupled to a delay circuit 85, the output of which goes high after a delay which is proportional to the magnitude of the output voltage. The reason for the delay is to allow the reverse current through the inductor 33 to rise to a sufficient level to insure that once the flywheel FET 32 is turned off, the node 1 voltage will rise to the level of $V_{IN}$. The time required for the reverse current through the inductor 33 to reach the necessary level is dependent upon the magnitude of $V_{OUT}$, and the delay circuit 85 takes this into account in providing the necessary delay interval for the reverse current to build in the inductor 33.

After this delay interval, the output of the delay circuit 85 goes high, and this high is one input to the AND gate 87.

During normal operation of the converter 30", the output of the delay circuit 85 goes high before a logic high is coupled to the AND gate 87 from the control circuit. Therefore, during normal operation, the control circuit determines when the FET 32 is turned off. However, during current limit mode, when the control circuit is attempting to couple more energy than is permitted from the input to the output of the converter, the input to the AND gate 87 from the control circuit goes high prior to the time that the output of the delay circuit 85 goes high. Therefore, in current limit mode, the comparator 82 and the delay circuit 85 control the timing of the turn-off of the flywheel FET 32.

Whether the signal from the control circuit or the output of the delay circuit 85 is the first to go to a logic high, once both of these signals are high, the output of the AND gate 87 goes high, resetting the flip-flop 86 and removing the drive signal from the driver 84 from the flywheel FET 32. This turns off the FET 32, permitting voltage to build across the flywheel FET 32 at node 1.

The current limit circuit shown in FIG. 8 is advantageous relative to prior current limit approaches in that a series sensing element in series with the FET 31 is not required. This eliminates the need for additional high-current carrying components and permits current limit sensing to be done with respect to circuit common, or the negative rail, simplifying the control circuitry.

Failures in buck converters that cause the series pass device, such as the series FET 31, to appear as a continuous low impedance can result in the input voltage of the converter appearing at the converter output. Since the value of this voltage may exceed the maximum voltage rating of devices connected to the output of the converter, a failure of this type can destroy many devices downstream from the converter, compounding the cost of the original failure. to prevent this from occurring, various protection circuits have been utilized. In one such circuit, the converter output voltage is sensed, and if it exceeds a selected threshold, an SCR connected in parallel with the output is gated on, impressing a low impedance across the output. A fuse is provided in series with the series pass device, and the ensuing surge of current when the SCR is turned on opens the fuse, removing input power from the converter.

Figure 9:
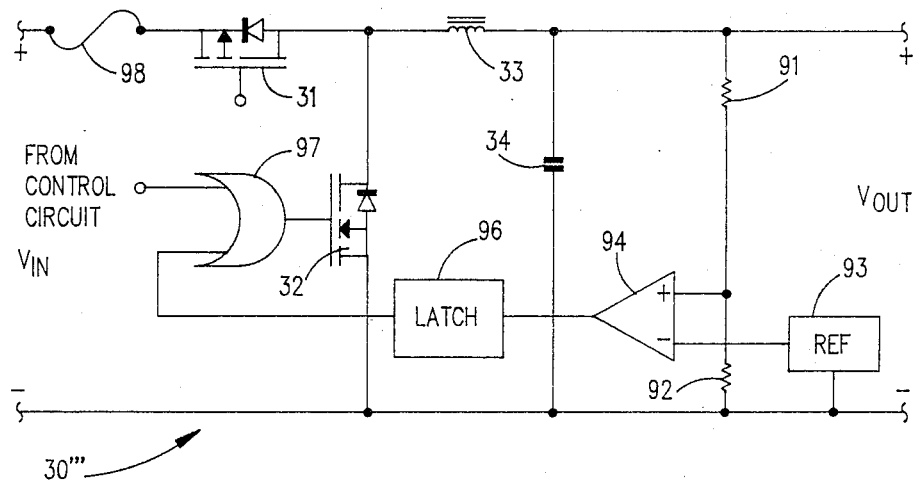
FIG. 9 is a diagrammatic illustration of the buck converter of FIG. 3 together with output over-voltage protection circuitry.

In FIG. 9, a converter 30''' similar to that of FIG. 3 includes a new over-voltage protection circuit. This circuit does not require an additional high-current device to shunt the output as in prior systems. In FIG. 9, a voltage divider made up of a resistor 91 and a resistor 92 is coupled across the converter output. The voltage at the junction between the resistors 91 and 92 is connected to the non-inverting input of a comparator 94, whose inverting input is connected to a voltage reference 93. If the output voltage of the converter rises above a threshold level, the voltage at the non-inverting input of the comparator exceeds the reference voltage, and the output of the comparator 94 goes high. A high ouptut from the comparator 94 sets a latch 96, with the output of the latch high. The output of the latch is one input to an OR gate 97. If the output of the latch 96 goes high, the output of the OR gate goes high, holding on the flywheel FET 32. During normal operation of the converter 30''', the control signals for the FET 32 are provided from a control circuit through the OR gate 97, with the input to the OR gate from the latch 96 merely remaining at a logic low.

If an over-voltage condition does arise, and the FET 32 is held on by the latch 96, when the series FET 31 is turned on, the resulting current surge (as current flows through the FET's 31 and 32) opens a fuse 98 connected in series with the FET 31 at the converter input. Opening the fuse 98 removes the input power from the converter.

Figure 10A:
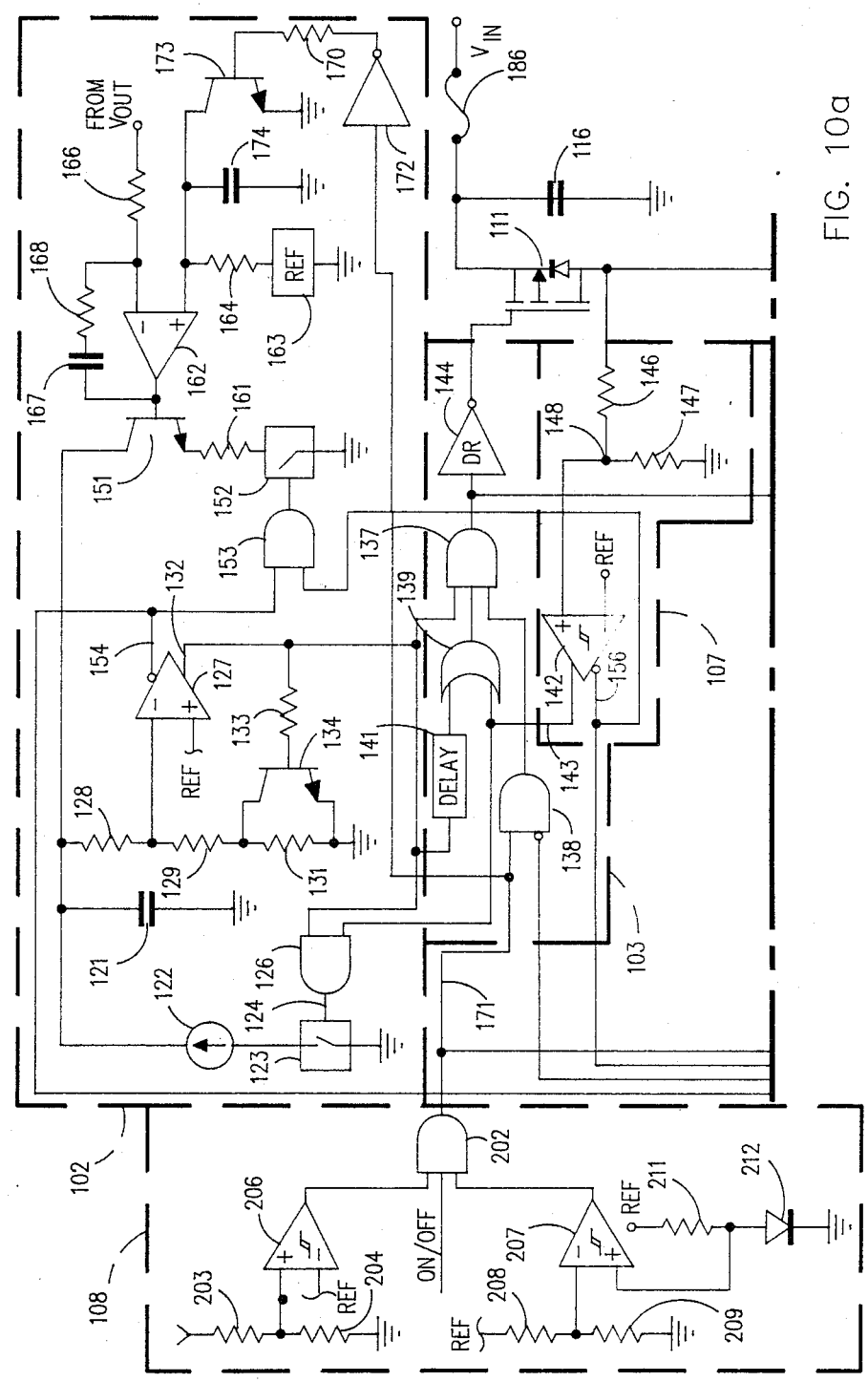
FIGS. 10a and 10b are circuit diagrams of an illustrative DC-to-DC buck converter including circuitry for peak-to-peak current control, current limiting, over-voltage protection and other control functions.
Figure 10B:
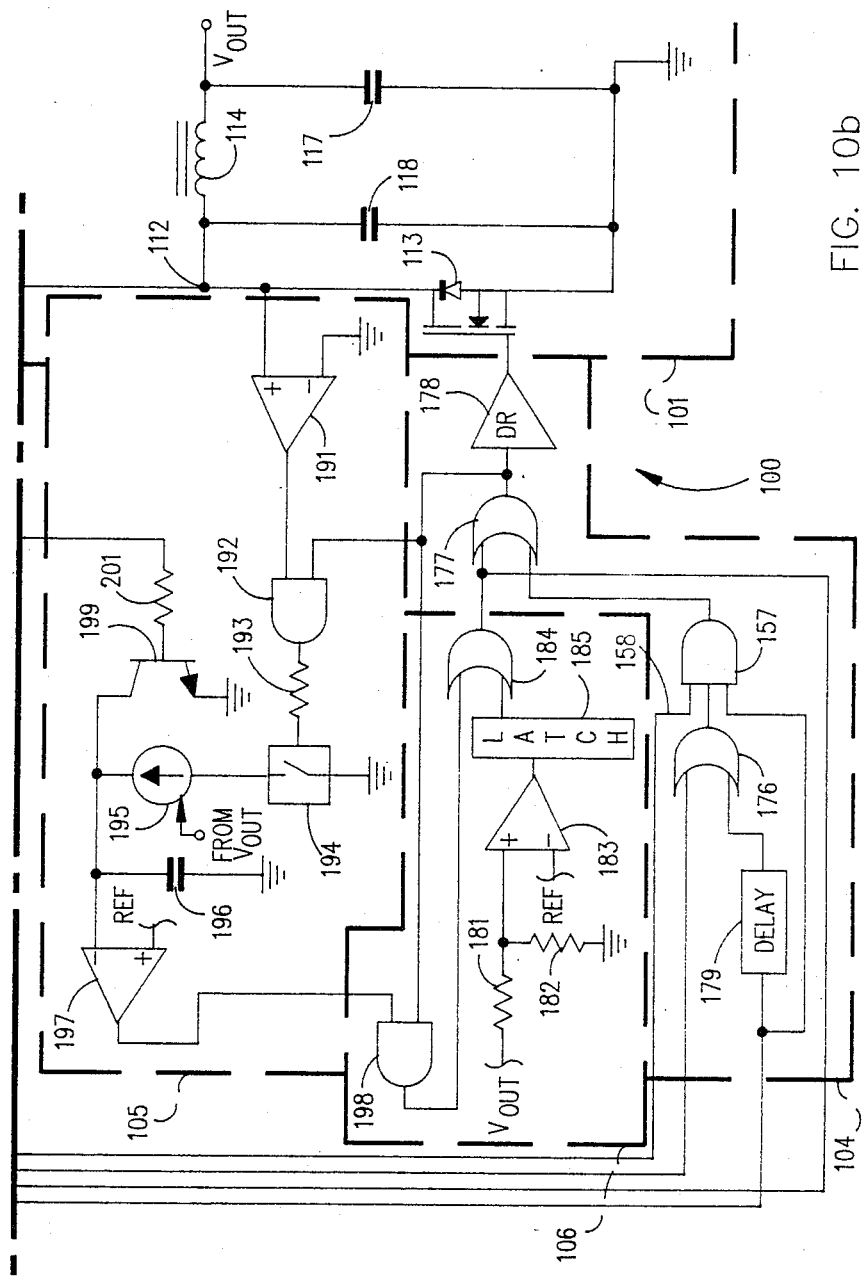

Turning now to FIG. 10, a buck regulator 100 including the various aspects of the invention earlier described includes a power portion 101, a control circuit 102, FET drive circuits 103, 104, a current limit circuit 105, an over-voltage protection circuit 106, a node monitoring circuit 107, and input circuitry 108 for controlling turn-on and turn-off of the regulator.

In the power portion 101 of the regulator, a series switch FET 111 is coupled between the input DC voltage $V_{IN}$ and a node 112 to which a flywheel FET 113 and an inductor 114 are also coupled. The other side of the inductor 114 is connected to the output voltage terminal $V_{OUT}$ of the regulator, and the other side of the flywheel FET 113 is connected to circuit common, or ground. An input capacitor 116 is connected between the input and ground, and an output capacitor 117 is connected between the output and ground. These capacitors provide filtering to reduce ripple at the input and output.

A capacitor 118 is connected to the node 112 to support the node voltage during turn off of the FET's 111 and 113. As earlier discussed, the capacitor 118 may be omitted in many cases, if the parasitic capacitances of the two FET's are sufficiently high. The power portion 101 of the regulator 100 operates in the same fashion as earlier described for the circuit of FIG. 3.

In order to provide the gate signals to turn the FET's 111 and 113 on and off at suitable times, a control circuit 102 emulates the peak-to-peak current through the inductor 114, utilizing the voltage on a capacitor 121. The control circuit 102 operates in a similar fashion to the control circuit shown in FIG. 7. In the control circuit 102, certain elements of the circuit have been shown diagrammatically, as is the case in certain other areas of the regulator circuit of FIG. 10.

Continuing with the description of the control circuit, starting from a time when the series FET 111 is conducting, the voltage is rising on the capacitor 121 in the control circuit 102. The charging current to increase the voltage on the capacitor 121 is provided from a current source 122, which produces a current proportional to the difference between the input and output voltages of the power portion of the circuit. During the time that the capacitor 121 is charging, a switch 123 is closed by a logic high output 124 from an AND gate 126.

During the time that the capacitor 121 is charging, a comparator 127 compares a fraction of the capacitor voltage to a reference voltage. The reference voltage is connected to the non-inverting input of the comparator 127. The capacitor voltage is divided down by a resistive divider including resistors 128, 129 and 131. As the capacitor 121 is charging, its divided-down voltage is less than the reference voltage connected to the comparator 127, and the non-inverted output 132 of the comparator 127 is at a logic high. This logic high is coupled through a resistor 133 to a transistor 134, which is turned on and shunts the resistor 131 in the resistance divider string connected across the capacitor 121. This results in a lower voltage being coupled to the inverting input of the comparator 127 during the charging cycle. Subsequently, when the transistor 134 is turned off during the discharge cycle, the voltage coupled from the divider string to the inverting input of the comparator 127 is higher than the reference and moves downwardly as the capacitor 121 is discharged.

The output 132 of the comparator 127 is also connected as one input to the AND gate 126, which controls the switch 123. Therefore, during the time that the capacitor 121 is charging, the AND gate 126 is enabled to produce a logic high output 124 when a suitable high output is obtained from the node monitoring circuit 107, as shall be described.

During the time that the series FET 111 is conducting, a negative gate signal must be provided to the FET. In order to accomplish this, the three inputs to an AND gate 137 in the FET drive circuit 103 must be at a logic high. A first input to the AND gate 137 is supplied from the non-inverted output 132 of the comparator 127, which during charging of the capacitor 121 and conduction of the series FET 111 is at a logic high. A second input to the AND gate 137 is supplied from an AND gate (having one inverting input) 138, the output of which is normally high when the regulator is turned on and not operating in the current limit mode. The third input to the AND gate 137 is the output of an OR gate 139, also in the drive circuit 103. The OR gate 139 has one input coupled through a delay circuit 141 to the non-inverted output 132 of the comparator 127. During start up, as the capacitor 121 is charged and discharged, the delay circuit 141 will provide an input to the OR gate 139 to begin operation of the FET drive, even in the absence of a signal at the other input to the OR gate 139.

The other input to the OR gate 139 is from a comparator 142 in the node monitoring circuit 107. The non-inverted output 143 of the comparator 142 is coupled to both the second input of the OR gate 139 and the second input to the AND gate 126. Therefore, during normal operation of the regulator 100, with the series FET 111 conducting, and the capacitor 121 in the control circuit charging, the output 143 of the comparator 142 must be at a logic high. This logic high, together with other logic high inputs to the AND gate 126, provides a logic high output 124 of the AND gate 126, closing the switch 123 so that the current source 122 can charge the capacitor 121 in the control circuit. The non-inverted output 143 of the comparator 142 also produces a logic high at the output of the OR gate 139 which, together with the other two logic high inputs to the AND gate 137, produces a logic high at the output of the AND gate 137. This logic high at the output of the AND gate 137 is coupled to an inverting driver 144. The output of the driver 144 is therefore a logic low, which turns on the series FET 111.

The function of the node monitoring circuit 107 is to insure that the voltage at the node 112 in the power portion of the regulator has reached a suitable level for turn on of each of the FET's 111, 113 at the requisite times. In other words, although the control circuit 102 may turn off one FET and enable the turn on of the other FET, the second FET will not be turned on until the node monitoring circuit 107 indicates that the voltage at the node 112 is at a suitable level.

The circuit 107 includes a resistance divider made up of resistors 146 and 147 which divide down the node voltage. The divided down node voltage, at the junction 148 between the two resistors, is connected to the non-inverting input of the comparator 142. The inverting input is connected to a reference voltage.

The comparator 142 includes a certain amount of hysteresis, so that the outputs of the comparator change state when the voltage at the node 112 reaches approximately the value of the input voltage and also when the voltage at the node 112 reaches approximately zero.

Prior to the time that the series FET 111 is turned on, the voltage rises at the node 112 due to the current reversal in the inductor 114. When this node voltage has risen to the level of the input voltage, the comparator 142 changes state with its non-inverted output 143 going to a logic high, at which it remains during conduction of the series FET 111. The outputs of the comparator 142 do not change until the voltage at the node 112 falls to zero, which does not occur until after the series FET 111 has been turned off.

Therefore, during the conduction of the series FET 111, the non-inverted output 143 of the comparator 142 remains at a logic high, so that all three inputs to the AND gate 137 are a logic high, producing the appropriate gating signal to the FET 111, keeping it turned on. The comparator 142 with hysteresis can be replaced by two comparators if desired, one of which compares the voltage at the node 112 to a high reference and one of which compares the voltage at the node to a low reference.

During the time that the capacitor 121 in the control circuit 102 is charging, the discharge path for the capacitor, through a transistor 151, is open. To insure this, a switch 152 in series with the transistor 151 is opened by a logic low output from an AND gate 153. During charging of the capacitor 121, one input to the AND gate 153, coupled from the inverted output 154 of the comparator 127, remains at a logic low. In addition, during conduction by the FET 111, the node monitoring circuit 107 produces a logic low at the inverted output 156 of the comparator 142, which is the other input to the AND gate 153. Therefore, both the comparators 127 and 142 must change state before the output of the AND gate 153 can go to a logic high, closing the switch 152 to discharge the capacitor 121.

When the voltage on the capacitor 121 in the control circuit 102 reaches the level indicative of the desired peak-to-peak current through the inductor 114, the voltage at the inverting input of the comparator 127 reaches the level of the reference input to the comparator, and the comparator outputs 132, 154 change state.

The non-inverted output 132 of the comparator goes low, so that the output of the AND gate 126 goes low, opening the switch 123 and stopping the flow of charging current into the comparator 121. The now-low output 132 from the comparator 127 also causes the output of the AND gate 137 to go low, taking the output of the inverting driver 144 high, turning off the series FET 111.

The inverted output 154 of the comparator 127 goes high, providing a logic high input to the AND gate 153, to enable the discharge circuit for the capacitor 121. The inverted output 154 of the comparator 127 is also coupled as one input to an AND gate 157 in the driver circuit 104 for the flywheel FET 113. A second input 158 to the AND gate 157 is coupled from the turn on control line 171, and is normally high when the regulator is on. The third input to the AND gate 157, which is now enabled due to the logic high state of the inverted output 154 of the comparator 127, is from the inverted output 156 of the comparator 142. This output will remain low until the node 112 in the power portion of the circuit reaches approximately zero, so that the output of the AND gate 157, although enabled, will not go to a logic high (to effect the turn on of the flywheel FET 113) until the node monitoring circuit 107 has detected the approximately zero voltage condition on the node 112.

Since there is a short interval during which both FET's are turned off, and also a short interval during which both of the switches 123 and 152 in the control circuit 102 are turned off, both the inductor 114 current and the capacitor 121 voltage will have rounded, or flattened, peaks. As will become apparent, this occurs at the turn off of each device, so that the waveforms of the inductor 114 current and the capacitor 121 voltage are triangular, with flattened upper and lower peaks.

After the series FET 111 has been turned off, and the voltage at the node 112 fallen to zero, the non-inverting input to the comparator 142 in the node monitoring circuit 107 falls below the reference value, and the comparator 142 non-inverted output 143 goes low and the inverted output 156 goes high. The logic low on the output 143 is coupled to the AND gate 126 which controls the switch 123 for charging the capacitor 121; but this low input to the AND gate 126 has no effect at this time since the other input to the AND gate is already at a logic low due to the previous change in state of the comparator 127. Likewise, coupling the logic low which is now on the output 143 of the comparator 142 (via the OR gate 139) to the AND gate 137 has no effect on the driver 144 for the FET 111, since the input to the AND gate 137 from the comparator 127 has previously gone low, already deactivating the driver.

The now-high inverted output 156 of the comparator 142 does have an effect on the control circuit and the power circuit. The output 156 is one input to the AND gate 153 in the control circuit 102. The other input to the AND gate 153 has previously gone high due to the change in state of the comparator 127. Therefore, once the output 156 from the comparator 142 goes high, the output of the AND gate 153 goes high, closing the switch 152 and permitting discharge of the capacitor 121 through the transistor 151 and a series resistor 161.

As earlier described with regard to FIG. 7, the level of conductance of the transistor 151 is controlled by an amplifier 162 in a manner to maintain the output voltage of the regulator at a desired level, proportional to a reference voltage 163. In order to do this, the reference voltage is coupled through a resistor 164 to the non-inverting input of an amplifier 162. The regulator output voltage is coupled through a resistor 166 to the inverting input of the amplifier 162. A feedback capacitor 167 and resistor 168 provide a stable feedback loop for the amplifier 162.

The discharge circuitry for the capacitor 121 also includes "soft start" circuitry operative when the regulator is turned on. During turn on of the regulator 100, an input control line 171 goes to a logic high, as shall be described in more detail hereinafter. This logic high is connected to an inverter 172, the output of which is coupled through a resistor 170 to the base of a transistor 173, which shunts the non-inverting input of the amplifier 162. This transistor 173, in cooperation with a capacitor 174, serves to provide a "soft start" for the control circuit. When the regulator is turned on, and the transistor 173 turned off, the capacitor 174 is charged by the voltage reference circuit 163 so that the full reference value does not appear at the reference input to the amplifier immediately upon turn on of the regulator. This has the effect of increasing the discharge interval for the capacitor 121 during start up of the regulator. This in turn permits the regulator to reach its normal operating level more slowly upon turn on.

Returning to the description of the effects of the logic high at the inverted output 156 of the comparator 142, not only is this logic high coupled to the AND gate 153 in the control circuit 102 to permit discharge of the control capacitor, but it is also coupled (through an OR gate 176) to the AND gate 157 in the driver circuit 104. This logic high input to the AND gate 157 results in all three inputs to the AND gate being high, and the now-high output of the AND gate 157 is coupled through an OR gate 177 to a driver circuit 178, whose output goes high, turning on the flywheel FET 113. Therefore, the flywheel FET 113 is not turned on until such time as the node 112 has reached a level of approximately zero volts, resulting in near zero switching loss during turn-on of the FET.

The OR gate 176 through which the logic high from the output 156 of the comparator 142 is coupled is provided to permit the connection of a delay circuit 179 for start-up operation. The delay circuit 179 functions in a manner analogous to the delay circuit 141, earlier described.

The OR gate 177, through which the turn on signal from the comparator 142 is coupled, is provided to permit the flywheel FET 113 to be driven on by either the current limiting circuit 105 or the over voltage protection circuit 106, as shall be described hereinafter.

When the non-inverted output 132 of the comparator 127 in the control circuit 102 goes low due to the comparator 127 changing state when the capacitor 121 is charged to its peak value, this turns off the transistor 134 connected in parallel with the resistor 131 in the divider resistance string connected across the capacitor 121. As earlier described with regard to FIG. 7, this raises the voltage of the junction between resistors 128 and 129, so that as the capacitor 121 discharges during its discharge cycle, the voltage at the inverting input to the comparator 127 moves downwardly toward the value of the reference voltage. As this occurs, the voltage at the inverting input to the comparator 127 reaches the value of the reference voltage, and the comparator 127 outputs again change state, with the non-inverted output 132 going high, and the inverted output 154 going low.

The logic low at the output 154 of the comparator 127 opens the switch 152, ending discharge of the capacitor 121, and also takes the output of the AND gate 157 in the driver circuit 104 low, effecting turn-off of the flywheel FET 113. The logic high on the non-inverted output 132 of the comparator 127 is coupled to the AND gate 126 and to the AND gate 137, enabling both of these gates.

When the voltage at the node 112 reaches approximately the value of the input voltage to the regulator 100, the comparator 142 in the node monitoring circuit changes state. When the comparator 142 changes state, the non-inverted output 143 of the comparator goes high, coupling a logic high to the already enabled AND gates 126 and 137, so that the switch 123 is closed beginning the charging cycle for the capacitor 121 and the driver 144 is activated, turning on the series FET 111. The above-described cycle of operation then repeats.

The over-voltage protection circuit 106 includes a resistive divider made up of resistors 181 and 182, with the junction between the resistors being connected to the non-inverting input of a comparator 183. The voltage at the non-inverting input to the comparator 183, which is proportional to the regulator output voltage $V_{OUT}$, is compared to a reference value. If the regulator output voltage exceeds the reference value, the output of the comparator 183 goes high, and this logic high is coupled to a latch 185. The output of the latch 185 is latched high and coupled through an OR gate 184 and the OR gate 177 to the driver 178 for the flywheel FET 113, turning on and holding on the FET. Continued current conduction through the series FET 111, and through the now-conductive flywheel FET 113, opens a fuse 186 connected in series with the $V_{IN}$ connection to the power portion 101 of the regulator. Although the high output of the OR gate 184 is coupled to the inverting input of the AND gate 138 in the drive circuit 103 for the FET 111, removing the gate drive from the FET, this often will not of itself alleviate an over-voltage condition since the FET 111 itself may be short-circuited.

The current limit circuit 105 functions to prevent turn-off of the flywheel FET 113 until the current through the FET has fallen below a specified value (that is, the reverse current through the coil 114 and the flywheel FET has exceeded a specified value). the time at which the current in the FET 113 passes through zero is determined by a comparator 191. The comparator 191 senses the voltage across the FET 113, and when this voltage goes above zero, indicative of current reversal, the output of the comparator 191 goes high. This output of the comparator 191 is coupled to an AND gate 192, which has a second input connected to the input to the driver 178 for the FET 113. The input to the AND gate 192 from the driver 178 input is high when the FET 113 is turned on. Therefore, when the voltage at the node 112 goes above ground, and the FET 113 is turned on, the output of the AND gate 192 goes high. The output of the AND gate 192 is coupled through a resistor 193 to a switch 194, and when the output of the AND gates goes high, the switch 194 is closed. When the switch 194 closes a current source 195 is permitted to charge a capacitor 196. The current provided by the current source 195 is proportional to the level of the output voltage $V_{OUT}$.

The level of the voltage on the capacitor 196 is coupled to the inverting input of a comparator 197, whose non-inverting input is connected to a voltage reference. When the voltage on the capacitor 196 exceeds the reference voltage, the output of the comparator 197 goes to a logic low. This low output of the comparator 197 is one input to an AND gate 198, whose other input is connected to the input of the FET driver 178. Therefore, when the FET 113 is turned on, and after the capacitor 196 in the current limit circuit 105 has charged sufficiently, the output of the AND gate 198 then goes low, and the output of the OR gate 184 goes low. This takes one of the inputs to the OR gate 177 low, and when its other input (from the control circuit 102) has gone low, this will deactivate the driver 178 and turn off the FET 113.

The delay in turn off of the flywheel FET 113 caused by current in the current source 195 charging the capacitor 196 provides a time interval during which current increases in the flywheel FET. Since the current charging the capacitor 196 in the current limit circuit 105 is proportional to $V_{OUT}$, as is the reverse current through the inductor 114, the current flowing into the flywheel FET 113 at the time of turn off will have a specified value during current limit operation when is independent of the actual value of $V_{OUT}$. This insures that there will be sufficient energy in the inductor when the flywheel FET 113 is turned off to subsequently bring the voltage at the node 112 up to the level of $V_{IN}$ to permit lossless turn-on of the series FET 11.

In cases where the circuit is not operating in current limit mode, the input to the OR gate 177 from the OR gate 184 can go low upon the determination by the current limit circuit 105 that there is suitable reverse current flowing through the FET 113, without this turning off the FET 113. This is because the other input to the OR gate 177, produced from the control circuit 102, can remain high, which produces a high output of the OR gate 177 so that the driver 178 keeps the FET 113 turned on.

When in current limit mode, holding on the flywheel FET 113, the turn on of the series FET 111 is prevented. To do this, the output of the OR gate 184, which is at a logic high during current limit mode, is connected to the inverting input of the AND gate 138 in the driver circuit 103. This causes the output of the AND gate 138 to be low, which produces a low at one of the inputs to the AND gate 137 controlling the driver 144 for the FET 111. Therefore, a drive signal for the series FET 111 is not provided during current limit mode. Nor, as earlier mentioned, is such a drive signal provided in the over voltage situation whee the other input to the OR gate 184 is high.

In order to reset the current limit circuit 105, each time the series FET 111 is turned on, meaning that a logic high signal has appeared at the output of the AND gate 137 in the FET driver circuit 103, this logic high is coupled through a resistor 201 to the base of a transistor 199 connected in parallel with the capacitor 196 in the current limit circuit, turning on the transistor 199. Turning on the transistor 199 discharges the capacitor 196.

In the input circuit 108, the output 171 of an AND gate 202 serves as a turn on control line for the regulator 100. The line 171 is normally high when the regulator 100 is turned on. One input to the AND gate 202 is an on/off line, which is high when, for example, a power-on switch is activated. Two other inputs to the AND gate 202 must be high in order to activate the regulator 100. One of these insures that the input voltage is above a desired threshold, and the other insures that the temperature of the FET's is below a critical level.

In the section 108 of the regulator 100, the input voltage $V_{IN}$ to the regulator is divided down by a resistance divider made up of a resistor 203 and a resistor 204. The divided down $V_{IN}$ is compared to a reference voltage by a comparator 206, which contains an amount of hysteresis, or which may be used in conjunction with a latch, with the output of the comparator 206 being normally high, but going low if the input voltage to the regulator is too low. The output of the comparator 206 is one input to the AND gate 202.

A thermal shutdown circuit, which produces the third input to the AND gate 202, includes a comparator 207, whose inverting input is connected to a resistance divider made up of resistors 208 and 209, coupled between a reference voltage and ground. The same reference voltage is also coupled through a resistor 211 and a diode 212 to ground. The diode 212 is physically located near the power FET's 111 and 113, and the diode characteristic is such that the voltage across the diode decreases as the temperature increases. If the temperature of the diode 212 increases sufficiently, and its voltage decreases sufficiently, the voltage across the diode, which is connected to the non-inverting input of the comparator 207, falls below the level of the reference voltage coupled to the inverting input of the comparator 207. If this occurs, the output of the comparator 207, which is normally high, goes low, taking the control line 171 low.

I claim:
1. A control circuit for controlling current flow through an inductor in a system which includes means responsive to a first control signal for coupling a first inductor voltage of a first polarity across the inductor and which includes means responsive to a second control signal for coupling a second inductor voltage of the opposite polarity across the inductor, comprising:
   a capacitor operable to be charged to a range of voltages;
   first means for changing the voltage on the capacitor, with a current of a first polarity which is proportional to said first inductor voltage, in response to an enabling signal;
   second means for changing the voltage on the capacitor, with a current of the opposite polarity which is dependent upon the level of said second inductor voltage, in response to an enabling signal; and means monitoring the voltage on the capacitor for alternatively (a) coupling an enabling signal to the first means and producing said first control signal when the voltage on the capacitor reaches a first level and (b) coupling an enabling signal to the second means and producing said second control signal when the voltage on the capacitor reaches a second level.

2. The control circuit of claim 1 in which the second means for changing the voltage on the capacitor produces a current dependent upon the deviation of said second inductor voltage from a set point level.

3. The control circuit of claim 2 in which the means monitoring the voltage on the capacitor comprises a comparator having a first input coupled to the capacitor and a second input coupled to a reference voltage.

4. A control circuit for controlling current flow through an inductor in a system which includes means responsive to a first control signal for coupling a first inductor voltage of a first polarity across the inductor and which includes means responsive to a second control signal for coupling a second inductor voltage of the opposite polarity across the inductor, comprising:

a capacitor operable to be charged to a range of voltages;

first means for changing the voltage on the capacitor, with a current of a first polarity which is proportional to said first inductor voltage, in response to an enabling signal;

second means for changing the voltage on the capacitor with a current of the opposite polarity in response to an enabling signal; and means monitoring the voltage on the capacitor for alternatively (a) coupling an enabling signal to the first means and producing said first control signal when the voltage on the capacitor reaches a first level and (b) coupling an enabling signal to the second means and producing said second control signal when the voltage on the capacitor reaches a second level.

5. The control circuit of claim 4 in which the means monitoring the voltage on the capacitor comprises a comparator having a first input coupled to the capacitor and a second input coupled to a reference voltage.

6. The control circuit of claim 4 in which said second inductor voltage is an output voltage and said first inductor voltage is the difference between the output voltage and an input voltage, whereby the inductor serves as an energy transfer device and the first means for changing the voltage on the capacitor serves to maintain the peak-to-peak current through the inductor at a constant value.

7. The control circuit of claim 6 in which the second means for changing the voltage on the capacitor produces a current of the opposite polarity from that produced by the first means for changing the voltage on the capacitor, with said opposite polarity current being of a magnitude dependent upon the deviation of the output voltage from a reference value; whereby the second means serves to maintain the output voltage at a selected level.

* * * * *